(12) United States Patent
Olivier et al.

(10) Patent No.: US 9,305,377 B2
(45) Date of Patent: Apr. 5, 2016

(54) METHOD AND APPARATUS TO DETECT AND CORRECT MOTION IN LIST-MODE PET DATA WITH A GATED SIGNAL

(75) Inventors: Patrick Olivier, Solon, OH (US); Amy Perkins, Philadelphia, PA (US); Bin Zhang, Cleveland, OH (US); Chi-Hua Tung, Aurora, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 155 days.

(21) Appl. No.: 13/977,030

(22) PCT Filed: Dec. 22, 2011

(86) PCT No.: PCT/IB2011/055901
§ 371 (c)(1),
(2), (4) Date: Jun. 28, 2013

(87) PCT Pub. No.: WO2012/093313
PCT Pub. Date: Jul. 12, 2012

(65) Prior Publication Data
US 2013/0287278 A1 Oct. 31, 2013

Related U.S. Application Data

(60) Provisional application No. 61/429,778, filed on Jan. 5, 2011, provisional application No. 61/433,545, filed on Jan. 18, 2011.

(51) Int. Cl.
*G06K 9/00* (2006.01)
*G06T 11/00* (2006.01)

(52) U.S. Cl.
CPC .............. *G06T 11/003* (2013.01); *G06T 11/005* (2013.01); *G06T 2211/412* (2013.01)

(58) Field of Classification Search
None
See application file for complete search history.

(56) References Cited

U.S. PATENT DOCUMENTS

| 6,292,684 | B1 * | 9/2001 | Du | G01R 33/5676 324/309 |
| 6,490,476 | B1 * | 12/2002 | Townsend | A61B 6/032 250/363.03 |
| 6,947,585 | B1 | 9/2005 | Jones | |
| 7,561,909 | B1 * | 7/2009 | Pai | A61B 5/055 324/307 |

(Continued)

FOREIGN PATENT DOCUMENTS

| CN | 101454801 | 6/2009 |
| CN | 101528131 | 9/2009 |

OTHER PUBLICATIONS

Taguchi et al ( toward time resolved 4D cardiac CT imaging with patient dose reduction: estimating the global heart motion; XP007908319; Jun. 2006.*

*Primary Examiner* — Nancy Bitar

(57) ABSTRACT

A PET scanner (20, 22, 24, 26) generates a plurality of time stamped lines of response (LORs). A motion detector (30) detects a motion state, such as motion phase or motion amplitude, of the subject during acquisition of each of the LORs. A sorting module (32) sorts the LORs by motion state and a reconstruction processor (36) reconstructs the LORs into high spatial, low temporal resolution images in the corresponding motion states. A motion estimator module (40) determines a motion transform which transforms the LORs into a common motion state. A reconstruction module (50) reconstructs the motion corrected LORs into a static image or dynamic images, a series of high temporal resolution, high spatial resolution images.

16 Claims, 2 Drawing Sheets

(56) References Cited

U.S. PATENT DOCUMENTS

| | | | |
|---|---|---|---|
| 7,599,540 B2 | 10/2009 | Koehler | |
| 7,620,444 B2 * | 11/2009 | Le et al. | 600/428 |
| 7,907,698 B2 | 3/2011 | Shao et al. | |
| 8,131,040 B2 * | 3/2012 | Koehler | A61B 6/466 |
| | | | 382/128 |
| 8,144,962 B2 * | 3/2012 | Busch et al. | 382/131 |
| 8,331,639 B2 * | 12/2012 | Brinks et al. | 382/128 |
| 8,417,007 B2 * | 4/2013 | Yui | G01R 33/56308 |
| | | | 378/8 |
| 8,478,014 B2 * | 7/2013 | Jandt et al. | 382/131 |
| 8,532,357 B2 * | 9/2013 | Wollenweber | 382/107 |
| 8,588,367 B2 * | 11/2013 | Busch et al. | 378/65 |
| 8,824,757 B2 * | 9/2014 | Kolthammer | A61B 6/032 |
| | | | 382/107 |
| 8,885,907 B2 * | 11/2014 | Lenox | 382/131 |
| 2005/0123183 A1 * | 6/2005 | Schleyer | G06T 5/20 |
| | | | 382/131 |
| 2005/0201509 A1 * | 9/2005 | Mostafavi | A61B 5/1135 |
| | | | 378/8 |
| 2006/0198490 A1 * | 9/2006 | Tsuyuki | A61B 6/032 |
| | | | 378/8 |
| 2007/0147589 A1 * | 6/2007 | Thielemans | 378/207 |
| 2008/0226149 A1 * | 9/2008 | Wischmann et al. | 382/131 |
| 2008/0240536 A1 * | 10/2008 | Soubelet et al. | 382/132 |
| 2008/0273780 A1 * | 11/2008 | Kohlmyer | A61B 6/032 |
| | | | 382/131 |
| 2010/0166274 A1 | 7/2010 | Busch et al. | |
| 2010/0202664 A1 | 8/2010 | Busch et al. | |
| 2010/0290683 A1 | 11/2010 | Demeester et al. | |
| 2010/0295846 A1 | 11/2010 | Schaefer et al. | |
| 2012/0278055 A1 * | 11/2012 | Schweizer et al. | 703/11 |
| 2013/0197347 A1 * | 8/2013 | Moghari | A61B 5/7207 |
| | | | 600/410 |
| 2014/0133717 A1 * | 5/2014 | Kabus et al. | 382/128 |

\* cited by examiner

METHOD AND APPARATUS TO DETECT AND CORRECT MOTION IN LIST-MODE PET DATA WITH A GATED SIGNAL

This application is a national filing of PCT application Serial No. PCT/IB2011/055901, filed Dec. 22, 2011, published as WO 2012/093313 Al on Jul. 12, 2012, which claims the benefit of U.S. provisional application Ser. No. 61/429,778 filed Jan. 5, 2011 and U.S. provisional application Ser. No. 61/433,545 filed Jan. 18, 2011, both of which are incorporated herein by reference.

The present application relates to the diagnostic imaging arts. It finds particular application in conjunction with positron emission tomography (PET) systems in which the data is collected in list-mode, and will be described with particular reference thereto. However, it will be appreciated that the following may also find application in other types of nuclear imaging, combined nuclear/CT imaging, CT imaging, and the like.

In PET imaging, each radioactive decay event causes a pair of diametrically opposed gamma rays which are concurrently detected to define a line of response (LOR). The LORs are collected over a period of time, typically significantly longer than a respiratory or cardiac cycle, and reconstructed into a 3D image. When imaging the lungs, the heart, or regions around them, the body tissues in which the radioactive decay occurs are spatially displaced cyclically due to the respiratory or cardiac motion, causing blurring (or loss of spatial resolution) in the resultant static image. This blurring makes it difficult or impossible to identify small lesions in the image.

One solution to the blurring problem is to gate or bin the data acquisition such that data in the same motion phase, or series of motion phases, over many repetitions of the cardiac or respiratory cycle is collected into a common bin. The data in the bin is reconstructed into an image in the motion phase(s). Only a fraction of the total data falls into each phase, therefore, the statistics of each gated image is poor. While this gating improves spatial resolution, it also adversely affects temporal resolution. In PET imaging, the rate at which the radioactive tracer is absorbed in various tissues and lesions, the rate it washes out of the various tissues and lesions, and the like, carries significant diagnostic value. By reconstructing an image from data collected over many cardiac or respiratory cycles, this temporal information becomes blurred or lost. It is prudent to correct the motion-induced blurring without compromising the image statistics.

In PET imaging, if one were to try to dynamically reconstruct data over time intervals short compared to the cardiac or respiratory cycle, only an inadequately small amount of data would be available for reconstruction of each dynamic interval. The resultant images will be noisy and may be difficult or impossible to identify small lesions. Motion correction techniques, such as Philips LMC (local motion correction), that use the dynamic images of the lesion to estimate the motion will experience the limited statistic, therefore the detectability and accuracy of motion estimation will suffer in particular for small lesion.

The present application proposes a new and improved method and apparatus which overcomes the above-referenced problems and others.

In accordance with one aspect, a method and apparatus are provided which generate PET images of a region of interest undergoing respiratory or cardiac motion, which images have excellent spatial and temporal resolution.

In accordance with another aspect, an imaging system is provided. A list-mode memory stores data generated of a moving subject in a list mode. One or more processors are programmed to sort the list data by motion state and reconstruct the list mode data in each of a plurality of motion. A correction to the list-mode data is derived from the images which transforms the list mode data into a selected reference motion state. The list mode data in the reference motion state are reconstructed into a motion corrected image. In accordance with another aspect, generated functional data of a subject is time stamped and stored in a list-mode. A plurality of high spatial resolution, low temporal resolution images are generated from the list-mode data. The high spatial resolution, low temporal resolution images are used to estimate the motion which transforms the list-mode data into a common motion state.

In accordance with another aspect, an imaging method is provided. Functional data generated as a subject moves through a plurality of motion states is time stamped. The functional data is stored in a list mode. A plurality of high spatial resolution, low temporal resolution images is generated from the list mode data. The high spatial resolution, low temporal resolution images are used to perform motion correction which transforms the list mode data into a common motion state. The motion corrected list mode data is reconstructed into a static image or dynamic images of high temporal and spatial resolution.

In accordance with another aspect, an imaging system includes a PET scanner system which generates a plurality of time stamped lines of response (LORs) of a subject cyclically moving through a plurality of motion phases. A motion detector detects a motion state of the subject during acquisition of each LOR. The sorting module sorts the LORs by motion state and one or more reconstruction processors reconstruct the LORs in each motion phase into a corresponding high spatial, low temporal resolution image. A local motion correction module determines from the high spatial, low temporal resolution images a transform which transforms the LORs into a common motion state. A reconstruction module may reconstruct the data into a static image, or the reconstruction module may reconstruct temporally contiguous groups of the LORs in the common motion phase into a series of high temporal resolution, high spatial resolution dynamic images.

One advantage resides in the generation of images with excellent temporal and spatial resolution.

Another advantage resides in the ability to identify and monitor radiation uptake and washout of radioactive tracers in even small regions and lesions which are undergoing cyclic motion.

In accordance with another advantage, motion is more accurately identified.

In accordance with another advantage, small, low-contrast lesions can be identified, such as small lung lesions.

In accordance with another aspect, acquisition statistics are maintained in a final output image.

In accordance with another advantage, patient radiation doses are not increased.

Still further advantages of the present invention will be appreciated to those of ordinary skill in the art upon reading and understand the following detailed description.

The invention may take form in various components and arrangements of components, and in various steps and arrangements of steps. The drawings are only for purposes of illustrating the preferred embodiments and are not to be construed as limiting the invention.

Figure 1:
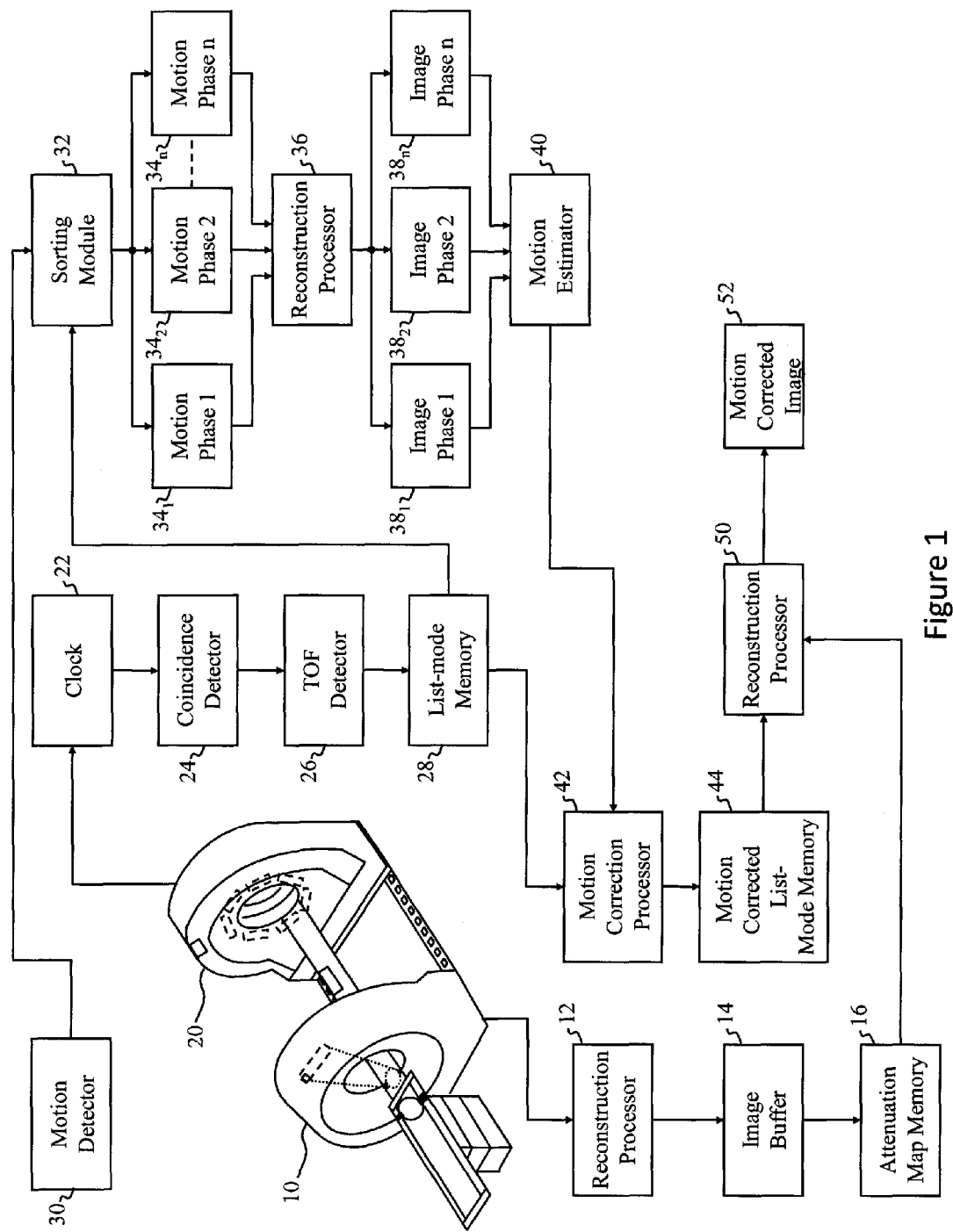
FIG. 1 is a diagrammatic illustration of an imaging system in conjunction with the present application.

With reference to FIG. 1, an anatomical scanner, such as a CT scanner 10, generates CT data from which a CT reconstruction processor 12 reconstructs a 3D anatomical image in a reference motion phase or a series of anatomical images in a series of reference motion phases. The reference image(s) are stored in a memory or buffer 14 and are converted to an attenuation map which is stored in an attenuation map memory or buffer 16 for use during reconstruction of PET or other functional images.

A functional imaging system, such as a PET imaging system, includes a gantry 20 in which a region of interest of a subject is positioned. In PET and other nuclear medicine systems, the subject is injected with a radiopharmaceutical tracer. A PET gantry system detects a series of detected radiation events which define end points of a series of lines of response (LORs). A clock 22 time stamps the detection events with their relative detection times. A coincidence detector 24 uses the time stamps to detect pairs of detection events which are sufficiently close in time that they are attributed to the same radiopharmaceutical decay event to define an LOR. A time-of-flight (TOF) detector 26 looks at a time difference between the detection events which define each LOR to localize the decay event along the LOR. The data are then stored in a list-mode memory 28. That is, the detection events which define each LOR and their timestamps are stored in order by time. These detection events continue to be stored in the list-mode even after they are reconstructed or otherwise processed, which allows adjustments to the underlying data to be made based on various reconstructions and the reconstruction process repeated to improve image quality.

A motion detector 30 monitors cyclic physiological motion and determines the current motion phase of the subject. The current motion phase is combined with each radiation detection event or LOR such that the motion state in which each radiation event was taken is stored in the list memory 28. The motion state detector 30 can take form in various combinations of hardware and software. In one example, the patient is physically monitored, such as with an EKG, video cameras, lasers which measure motion, fluoroscopic imaging, and the like to estimate the motion phase. In another embodiment, each motion phase is mapped to a characteristic of the captured motion waveform. For example, the maxima and minima of the amplitude of one or more motion cycles of the wave is identified. From these data points the slope of the waveform during each motion phase is determined. The characteristics, such as the maxima, minima, and slope along with others such as median, mean, or the like, are mapped to the motion signal. Phase-to-amplitude or slope mapping can be used to identify time stamps of the projection data, for different cycles, that correspond to the same motion state and that have a common or same mechanical amplitude or phase. This may facilitate mitigation motion artifacts due to misalignment of structure along different cycles. More specifically, a gating or sorting routine or module 32 sorts the list mode data by the physiological motion phase, amplitude, and/or slope into a plurality of motion phase buffers $34_k, 34_2, \ldots, 34_n$. One or more reconstruction processors 36 reconstruct the data in each motion phase into high spatial resolution, low temporal resolution images which are stored in corresponding image memories or buffers $38_k, 38_2, \ldots, 38_n$.

A motion estimator 40 performs a motion correction estimation. Briefly summarized, the motion estimator module 40 models the motion and determines how various voxels in the image region moved during the modeled motion. A motion model can be calculated from the gated images stored in buffers $38_k, 38_2, \ldots 38_n$. One method calculates the motion model by using a center of gravity calculation on the volume of interest in the gated images. Another method determines a warped motion of a surface in the gated images, such as the liver-lung boundary or heart motion. From this, a motion model can be determined for a selected motion phase or a plurality of selected motion phases. The motion estimator 40 determines the transform for transforming all of the motion states to a common motion state or series of common motion states, advantageously the motion state or series of motion states of the attenuation map 16. Finally, the motion estimator 40 determines how this transform alters the locations in the PET gantry at which the radiation detection events which define each of the LORs would be modified if all of the decay events occurred in the reference motion phase(s). A motion correction module or processor 42 adjusts the LORs, particularly the locations of the two radiation detected events which define each LOR to the location at which they would have been detected if the patient were in the reference motion phase(s). The motion corrected LORs and LOR detection points are stored in a reference motion corrected list-mode buffer or memory 44. The data in the reference motion phase list-mode memory or buffer 44 still retains the time stamp corresponding to each LOR. One or more reconstruction processors 50 reconstructs the motion corrected list-mode data using the attenuation map from the attenuation map memory 16 to correct for attenuation into a motion-corrected image representation 52. This reconstruction may be a static or dynamic reconstruction.

Figure 2:
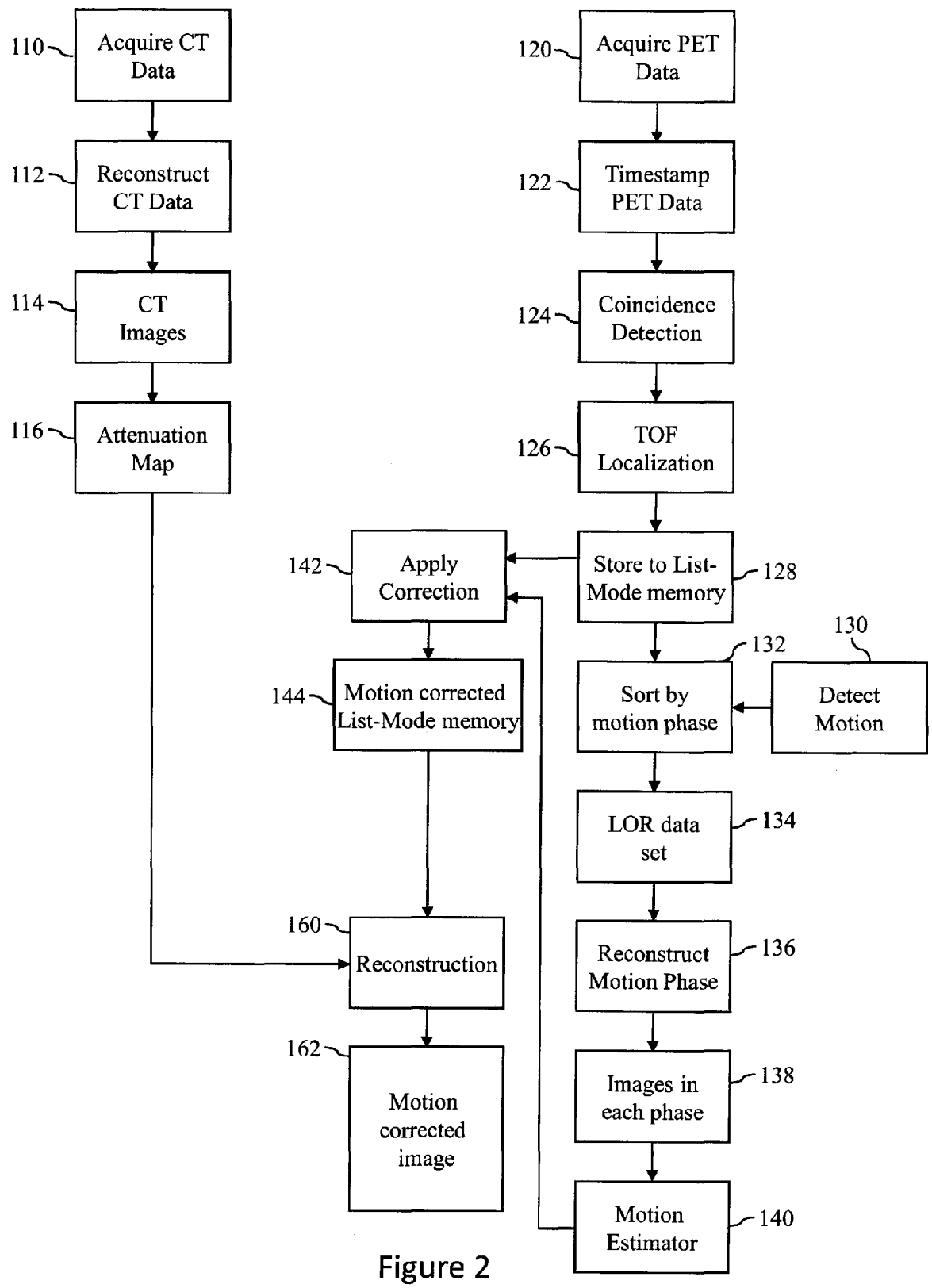
FIG. 2 is an imaging method which achieves 4D images with high resolution in both the spatial and temporal dimensions.

With reference to FIG. 2, CT data is acquired 110 and reconstructed 112 into a set of CT images 114 which are used to create an attenuation map 116. PET or other nuclear data is generated 120, time stamped 122, and coincidence detected 124 to define the LORs. At 126, location of the radiation event along each LOR is localized by comparing the relative times at which each end of the LOR was detected. The localizer assigns a probability distribution along each LOR that gives the likelihood that the event occurred at each point along the LOR, typically a bell-shaped curve. The LORs and detection events are stored 128 in list-mode. The patient's motion phase is monitored 130 and the list-mode data is encoded with the motion phase of each LOR and sorted 132 by motion phase, state or amplitude into a plurality of data sets 134 in each of the plurality of motion states or amplitudes. The data in each motion phase is reconstructed 136 to generate a series of images 138 which have high spatial resolution. Because the data was collected over many motion cycles, the images have poor temporal resolution.

A motion estimator routine 140 is performed on the images 138 to determine and apply 142 transforms which transform the images and the underlying LORs into a common motion phase, particularly the reference motion state. The series of high spatial resolution images are used to generate a motion model, that is, a model of how the patient as a whole or one or more regions of the patient move over the motion cycle. The motion between the high spatial low temporal resolution is interpolated into a smooth curve, e.g., a sinusoidal curve. The motion model represents motion or displacement from a selected or reference state at each temporal point in the respiratory cycle.

Going back to the original list mode data, the time stamp associated with each LOR shows the point or time in the motion cycle that the LOR was collected. The motion model shows the displacement from the reference state, e.g., a vector which shows the amount and direction of the displacement. The vector is applied to the LOR, e.g., the apex of the time-of-flight probability distribution, to shift the LOR to the location in which it would have been detected had the patient been in the reference motion state, i.e., the LOR is transformed into the reference motion state. The LORs in the same reference motion state or amplitude are stored 144 in a motion corrected list-mode memory with the original time stamp. That is, the LORs, by virtue of the time stamps, have excellent temporal resolution. The motion corrected list-mode data 144 is reconstructed 160 into one or more motion corrected images 162. This reconstruction may be a static or dynamic reconstruction. The LOR can be grouped in temporally contiguous groups which each contain enough LOR to reconstruct an image with high spatial resolution. These groups are reconstructed to generate a series of high resolution images at relatively short temporal intervals which can be displayed, for example, in a high temporal resolution cine mode to show uptake and washout of a tracer, progress of the tracer moving through the patient, or the like.

One or more processors may be provided to perform steps 112-116 and 122-164. Similarly, software for programming the one or more processors to perform these methods is stored on a computer-readable medium. Suitable non-transitory computer-readable medium include magnetic disks, other magnetic storage media, optical disks or other optical storage media, random access memories, read-only memories, other electronic memory devices, chips, sets of interconnected chips, an Internet server memory from which the stored instructions can be retrieved, and the like.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. An imaging system comprising:
   a list-mode memory which stores nuclear image data generated of a subject moving through a plurality of motion states in a list-mode;
   a clock configured to mark the list-mode data with time stamps;
   a motion sensor configured to sense motion states of the subject as the data is generated;
   at least one processor programmed to perform the steps of:
      sorting the stored list-mode data based on the motion state,
      reconstructing the list-mode data sorted into each of the motion states into a high spatial resolution, low temporal resolution image, each high spatial resolution, low temporal resolution image being in a different one of the plurality of the motion states,
      deriving from the high spatial resolution, low temporal resolution images transforms which transforms the list-mode data into one or more selected motion states, and
      reconstructing the stored list-mode data transformed to the one or more selected motion state into a static image with a high temporal resolution and a high spatial resolution or reconstructing the list-mode data transformed into each of a plurality of motion states into a dynamic series of images with high temporal resolution and high spatial resolution.

2. The system according to claim 1, wherein motion state includes at least one of motion phase and motion amplitude.

3. The system according to claim 1, further including:
   a positron emission scanner configured to generate PET nuclear image data;
   a coincidence detector configured to find coincident detection data pairs to define lines of response (LORs), the lines of response and the time stamps being stored in the list-mode data memory.

4. The system according to claim 3, further including:
   a time-of-flight processor configured to analyze differences in arrival times of the two coincident events in the PET image data to localize a radiation decay event along each LOR.

5. The system according to claim 1, further including:
   an anatomical scanner configured to scan the subject to generate anatomical image data; and
   wherein the at least one processor is further programmed to:
      reconstruct the anatomical data into one or more anatomical images in the one or more selected motion states; and
      generate an attenuation map in the one or more selected motion states; and
      correct the list-mode data transformed into one of the selected motion states with the attenuation map in the one selected motion state during the reconstructing.

6. The system according to claim 1, wherein:
   the motion states of the subject sensed by the motion sensor as the data is generated is recorded with the concurrently generated nuclear data in the list-mode memory.

7. The system according to claim 3, wherein the list-mode memory is configured to store list-mode data for each LOR, the list-mode data for each LOR including the time stamp and a detected motion state.

8. The system according to claim 1, wherein the monitored motion states of the subject sensed during generating of the nuclear image data are combined with the nuclear image data; and
   wherein the list-mode memory is configured to store the combined nuclear image data with the sensed motion states.

9. An imaging method comprising:
   time stamping generated functional nuclear data lines of response (LORs) generated as a subject moves through a plurality of motion states;
   monitoring the motion states of the subject during generating of the functional nuclear data LORs;
   storing the functional nuclear data LORs in a list-mode based on the time stamping, the stored functional data LORs including a corresponding motion state indicator;
   generating a plurality of low temporal resolution motion phase images from the stored list-mode data, each of the plurality of motion phase images corresponding to one of the plurality of motion states;
   from the plurality of motion phase images determining a motion model which models the plurality of motion states;
   transforming the stored list-mode functional nuclear data LORs to a first selected motion state using the motion model;
   reconstructing the list-mode functional nuclear data LORs transformed into the first selected motion state into a first high temporal and spatial resolution image.

10. The method according to claim 9, further including:
    selecting a second motion state;
    transforming the stored list-mode functional nuclear data LOR into the second selected motion state;
    reconstructing the list-mode functional nuclear data LORs transformed into the second motion state into a second high temporal and spatial resolution image, the second high temporal and spatial resolution image depicting the subject in the second selected motion state.

11. The method according to claim 9, further including prior to generating the motion phase images, sorting the list-mode functional nuclear data LORs according to motion state:
   identifying an amplitude and slope of a waveform corresponding to each motion state;
   mapping the amplitude and slope to the waveform of the corresponding motion state; and
   sorting the list-mode functional nuclear data LORs by motion state based on at least one of amplitude and slope.

12. The method according to claim 9, further including:
   generating an attenuation map of the subject in the first selected motion state; and
   using the first selected state attenuation map to perform attenuation correction during the reconstructing of the list-mode functional nuclear data LORs into the first high temporal and spatial resolution image.

13. The method according to claim 9, further including:
   after determining the motion model, grouping the stored nuclear image data LORs into temporally contiguous LOR groups;
   transforming each of the LOR groups into the first selected motion state;
   reconstructing the transformed LOR groups into a series of temporally displaced high temporal and spatial resolution images in the first selected motion state.

14. A non-transitory computer-readable medium carrying software which controls one or more processors to perform the method according to claim 9.

15. An imaging system comprising:
   a functional scanner which generates the functional data; and
   one or more processors programmed to perform the method according to claim 9.

16. An imaging system comprising:
   a PET scanner system configured to generate a plurality of time stamped lines of response (LORs) of a subject undergoing cyclic motion;
   a motion detector configured to detect a motion state of the subject during acquisition of each of the LORs;
   a list-mode memory configured to store each LOR in a list-mode including a time stamp and the detected motion state;
   a sorting module configured to sort the stored LORs by motion state;
   one or more reconstruction processors configured to reconstruct the LORs in each motion state into a high spatial, low temporal resolution image of the subject in the corresponding motion state;
   a motion estimation module configured to determine a motion model from the high spatial, low temporal resolution images;
   a motion correction module configured to transform the LORs into a common motion state;
   a reconstruction module configured to reconstruct temporally contiguous LOR groups the LORs in the common motion state into a temporally spaced series of high temporal resolution, high spatial resolution images.

* * * * *